3,492,126
SOFT-FROZEN WHIPPED AQUEOUS EXTRACT
CONCENTRATE OF COFFEE OR TEA
Irving H. Rubenstein, Stevenson, Md., assignor to Maryland Cup Corporation, Owing Mills, Md., a corporation of Maryland
No Drawing. Continuation-in-part of application Ser. No. 553,598, May 3, 1966. This application Nov. 9, 1966, Ser. No. 592,970
Int. Cl. A23f 1/08, 3/02
U.S. Cl. 99—71                    12 Claims

ABSTRACT OF THE DISCLOSURE

Concentrated coffee and other concentrated foods do not retain their high level of flavor when they reach the consumer. In order to retain flavor the food extract such as coffee, tea and the like is extracted and cooled in a closed system to retain in the extract the volatile flavor and aroma components and then soft-frozen in order to retain flavor and to be spoonable for ease in use by the consumer, thus making it immediately available for use by a consumer. The food extract is soft-frozen and contains in addition to the extracted solids a whipping aid, a stabilizer and optionally an antioxidant.

---

This application is a continuation-in-part of application Ser. No. 553,598, filed May 3, 1966, now abandoned.

This invention relates generally to soft-frozen food extracts and to beverages prepared therefrom, and more particularly, to soft-frozen coffee extract and the method of its preparation.

The extraction of coffee roastings by percolation to produce extract concentrations of 25% and higher has long been known. The resulting percolator extract retains a high level of natural coffee flavor, so that drinking coffee made therefrom closely resembles freshly brewed coffee made from roasted and ground beans, in both flavor and aroma. However, although the conversion of coffee extract to the powder and instant forms convenient to consumers is presently carried out on a large scale, it is well recognized in the art that the resulting soluble coffee retains less than ten percent of the flavor and aroma present in the original extract. This loss is incurred to a large degree in volatilization during the drying operations by which coffee extract is transformed into powder form.

Attempts have been made to improve coffee flavor retention during powder manufacture, but the problem has never been really solved. An alternative approach has been to subject the coffee extract to a freeze drying step, but this is costly and time-consuming. There is also known in the prior art the preparation of hard-frozen coffee and tea extracts, but these have the disadvantage of requiring a thawing period and of consequent unavailability for immediate use by the consumer.

With this in mind, it is a main object of the invention to provide an extract concentrate which retains a high level of natural coffee flavor.

Another object of the invention is to provide an extract concentrate in frozen form but which can nevertheless remain available for immediate use by the consumer.

These objects and others ancillary thereto are in accordance with preferred embodiments of the invention wherein there is provided a novel soft-frozen coffee extract in the form of a concentrate which retains a high flavor and aroma almost indistinguishable from that of freshly brewed, roasted and ground coffee. The extract in soft-frozen form can be maintained in frozen condition in conventional frozen food cabinets in retail food establishments and in the home. The extract is prepared utilizing standard coffee processing equipment.

While the practice of the invention will be illustrated with regard to the preparation of coffee extracts, it will be understood that the principles involved are readily adaptable to the preparation of soft-frozen food extracts of other types, including tea, chicory, clear soups, cocoa, spice extracts, and the like, so that the preparation of coffee extract is to be regarded as illustrative and not as limiting the scope of the invention.

The term soft-frozen as employed herein designates an aqueous extract frozen to a degree such that it has a homogeneous texture and a semi-rigid consistency, resembling that of ordinary soft ice cream, in which it is spoonable, and can readily be introduced into containers and stored in freezers and frozen food cabinets. The extract of the invention forms a homogeneous system in which there is no phase separation. The freezing is such that the ice present is in the form of small crystal lattices and there is no separation of ice crystals as such. The extract is readily meltable and is completely soluble, so that it can be converted directly to beverage form. Soft-frozen coffee extract is unique and provides maximum ease of handling, including eliminating any need for defrosting.

The preparation of the novel soft-frozen coffee extract of the present invention is to be distinguished from the partial freezing of coffee infusions to form snowy crystals which are removed to concentrate and dehydrate the infusion. In the coffee extracts of the present invention the original concentration is maintained and the separation of ice crystals is avoided.

The novel coffee extract of the invention is prepared by the percolation of roasted and ground coffee in a closed system at an elevated temperature of about 160° F. and higher, if necessary at corresponding superatmospheric pressure, and preferably at a temperature between about 180° and 240° F., followed by cooling of the extract to a temperature between about 35° and 55° F., preferably about 40° F., at a controlled rate of cooling. There are incorporated into the extract one or more (a) whipping aids, (b) stabilizers, and optionally (c) antioxidants. The extract is then converted to a soft-frozen mass in freezing apparatus of the type conventionally used for the manufacture of ice cream while incorporating a controlled amount of air or an inert gas, to obtain a homogeneous soft-frozen mass. The presence of the whipping aid and the control of temperature and aeration prevent the mass from freezing solid. The additives can be incorporated either prior to percolation, or to the water used for percolation, or to the percolation liquor, or following percolation.

The present invention departs from prior methods of preparing coffee, tea, and other food evtract concentrates by first forming an initial aqueous extract in a closed system to minimize the escape of volatile flavor and aroma, and then cooling promptly, and preferably within a few seconds, while maintaining the closed system.

The percolation of the roasted and ground coffee is carried out, in accordance with the method of the invention, to coffee solubles concentration of the extract of about 20% to about 50% by weight, preferably about 40% to 45%, and this is substantially the concentration of coffee solubles in the final soft-frozen product. Higher solubles are undesirable since they retard percolation and introduce tars and objectionable flavors.

The percolation is performed in conventional coffee equipment, comprising a sequence of extraction columns in which hot water at a temperature between about 180° and 240° F., enters the column with the most spend grounds and moves countercurrent and upwardly through each column of less spent coffee grounds, the extract flow being in series through each column. The extract at the desired concentration leaves the column containing freshest grounds and is withdrawn periodically. Advantageously, the extraction is conducted in four stages, with about 10% of the solubles being extracted per stage. The residence time within the system must be controlled so as to avoid extraction of undesirable coffee oils and hydrolysis products, and therefore is kept within a period of about 1 to 2 hours, depending upon the degree of roast, type of coffee bean, and similar considerations.

When the extract has reached the desired concentration, and while under the pressure corresponding to the solution temperature of the extract, it is immediately cooled to a temperature between about 35° and 55° F., preferably about 40° F., in an indirect heat exchanger apparatus, maintaining the exclusion of air. The cooling is preferably carried out within a period of a few seconds, for example, about 10 to 60 seconds.

The cooled extract is then transferred to a commercial type ice cream freezer equipped with rotating whipper and agitated and chilled while incorporating a controlled amount of air or an inert gas, such as nitrogen, the amount of gas being sufficient to result in an increase in volume of about 10% to 20%.

The additives, which are described more fully hereinafter, will have been added to the system at an earlier stage. Addition to the roasted and ground coffee eliminates an admixing step following percolation. The action of the refrigerant results in a soft-frozen mass containing about 40% to 45% solids, having a consistency similar to that of ice cream, which can be packed in paper or plastic containers, and dispensed therefrom by spooning. The original flavor and aroma are fully preserved.

The addition of a whipping aid contributes to the formation and maintenance of a soft-frozen product. The amount of whipping aid employed, in accordance with the invention, is between about 0.05% and about 0.5% by weight on the basis of finished extract. Examples of suitable whipping aids include soya proteins, egg albumin, milk protein, lecithin, propylene glycol monostearate, mono- and di-glycerides of edible fatty acids, e.g. glyceryl monostearate, sorbitan derivatives of edible fatty acids, e.g., polyoxyethylene sorbitan stearate, and polyoxyethylene compounds of edible fatty acids, whether they be glyceryl or sorbitan derivatives.

The amount of stabilizer employed, in accordance with the invention, is between about 0.05% and about 0.1% by weight on the basis of finished product. Examples of suitable stabilizers include vegetable gums, such as guar gum, locust bean gum, and gum arabic, as well as sodium alginate, propylene glycol alginate, carageenan, pectin, gelatin, methylcellulose, and carboxymethylcellulose. Alternatively, starches, such as corn, tapioca, potato, wheat, and the like, may be used in the amount of between about 0.5% and 2.0% by weight of finished product. The stabilizers serve to promote the freezing of the aqueous compound of the extract into fine uniform crystals.

The amount of antioxidant added may vary between about 0.01% and 0.03% by weight on a finished product basis. Examples of suitable antioxidants include butylated hydroxyanisole, butylated hydroxytoluene, and propyl gallate.

The practice of the invention is illustrated by the following examples, which are, however, not to be regarded as limiting:

EXAMPLE 1

100 pounds of roasted and ground coffee were admixed with soya protein, guar gum, and propyl gallate, in amounts sufficient to provide the concentrations indicated below in the final soft-frozen product, and the batch was extracted with hot water at a temperature of 230° F., in a four-column percolation apparatus for a period of 1 hour, in countercurrent operation, to form an extract containing approximately 40% by weight of coffee solubles. The extract was then passed through the tubes of a water cooled surface condenser and cooled within 30 seconds to a temperature of 40° F. Both the percolator and cooler were maintained in a closed system with exclusion of atmospheric air. The extract contained the following ingredients:

| | Percent |
|---|---|
| Coffee solubles (40% by weight) | 99.85 |
| Soya protein | 0.1 |
| Guar gum | 0.05 |
| Propyl gallate | 0.01 |

The cooled extract was then treated with air in an ice cream freezing apparatus until a 10% to 20% overrun was effected. The resulting composition had a consistency of soft ice cream, and excellent coffee flavor and aroma.

EXAMPLE 2

Proceeding as in Example 1, a soft-frozen coffee concentrate was produced having the composition:

| | Percent |
|---|---|
| Soya proteins | 0.05 |
| Locust bean gum | 0.05 |
| Coffee concentration (30%) | 99.9 |

EXAMPLE 3

Proceeding as in Example 1, a soft-frozen coffee concentrate was produced having the composition:

| | Percent |
|---|---|
| Egg albumin | 0.1 |
| Carboxymethyl cellulose | 0.1 |
| Coffee concentrate (40%) | 99.8 |

EXAMPLE 4

Proceeding as in Example 1, a soft-frozen coffee concentrate was produced having the composition:

| | Percent |
|---|---|
| Egg albumin | 0.2 |
| Sodium alginate | 0.15 |
| Sodium citrate | 0.01 |
| Coffee concentrate (40%) | 99.64 |

EXAMPLE 5

Proceeding as in Example 1, a soft-frozen coffee concentrate was produced having the composition:

| | Percent |
|---|---|
| Soya proteins | 0.2 |
| Propylene glycol alginate | 0.2 |
| Coffee concentrate (35%) | 99.6 |

EXAMPLE 6

Proceeding as in Example 1, a soft-frozen coffee concentrate was produced having the compositions:

| | Percent |
|---|---|
| Soya proteins | 0.15 |
| Pregelatinized tapioca starch | 1.0 |
| Coffee concentrate (40%) | 98.85 |

EXAMPLE 7

Proceeding as in Example 1, a soft-frozen coffee concentrate was produced having the composition:

| | Percent |
|---|---|
| Whipping milk proteins | 0.5 |
| Corn starch | 1.5 |
| Coffee concentrate (30%) | 98.0 |

A modification of the procedure explained above comprises mixing roasted coffee beans from which the aqueous extract is to be made with the dry additives according to any of the examples above and then subjecting the dry mix to aqueous extraction by a continuously percolating process which is well known in the art. This results in a concentrated extract which can be controlled to any desired concentration and which will also contain the additives in solution, whereupon it is only necessary to cool the resulting solution and subject it to the same whipping and freezing procedure as set forth above.

EXAMPLE 8

Proceeding as described in Example 1, tea leaves were percolated with water at a temperature of 240° F., with addition of soya protein, guar gum, and propyl gallate in the proportions indicated. The resulting soft-frozen product when dissolved in water provided a beverage having the flavor and aroma of freshly brewed tea.

It will be understood that the above description of the present invention is susceptible to various modifications, changes, and adaptations.

What is claimed is:

1. A soft-frozen whipped aqueous extract concentrate of a food selected from the group consisting of coffee and tea having a homogeneous texture and a semi-rigid consistency and containing extracted food and flavor solids and volatiles, a whipping aid in an amount between about 0.05% by weight of said extract and an upper limit sufficient to promote whipping with the formation of a soft-frozen product, and a stabilizer capable of promoting freezing to fine uniform crystals in an amount between about 0.05% by weight of said extract and an upper limit sufficient to promote freezing to fine uniform crystals.

2. The composition of claim 1 in which the concentration of coffee solids is between about 40% and 45% by weight.

3. A beverage comprising an aqueous solution of the soft-frozen extract of claim 1.

4. A coffee beverage comprising an aqueous solution of the soft-frozen extract of claim 1.

5. A method for the preparation of a soft-frozen whipped aqueous extract concentrate of an extractable food selected from the group consisting of coffee and tea having a homogeneous texture and a semi-rigid consistency and containing food and flavor solids and volatiles, comprising the steps of:

treating, while retaining the volatile and flavor materials thereof, said extractable food with an aqueous extractant in a closed system under superatmospheric pressure at a temperature of at least about 160° F., to form an aqueous system containing extracted food and flavor solids and volatiles;

incorporating into said system at any stage, including the admixture with said extractable food, a whipping aid in an amount between about 0.05% by weight of said extract and an upper limit sufficient to promote whipping with the formation of a soft-frozen product and a stabilizer capable of promoting freezing to fine uniform crystals in an amount between about 0.05% by weight of said extract and an upper limit sufficient to promote freezing to fine uniform crystals;

rapidly cooling the aqueous extract system to a temperature between about 35° and about 55° F., said extraction and cooling being performed with exclusion of air; and then whipping and chilling said aqueous system in the presence of a gas to form a whipped soft-frozen extract concentrate, the amount of gas being sufficient to result in an increase in volume of about 10% to about 20%.

6. The method of claim 5 in which the extractable food is tea.

7. The method of claim 5 in which the extractable food is roasted and ground coffee and said aqueous system contains between about 20% and about 50% by weight of extracted solids.

8. The method of claim 7 in which whipping aid and stabilizer are admixed with the roasted and ground coffee prior to extraction.

9. The method of claim 7 in which the whipping aid and stabilizer are incorporated during the extraction step.

10. The method of claim 7 in which the whipping aid and stabilizer are incorporated following extraction.

11. The method of claim 7 in which the extraction is performed by multistage countercurrent percolation.

12. In the method of preparing a soft-frozen whipped aqueous coffee extract concentrate, the improvement comprising the steps of:

incorporating a whipping aid and a stabilizer into an aqueous system containing between about 20% and about 50% by weight of extracted coffee solids and volatiles in a closed system under superatmospheric pressure, the amount of said whipping aid being between about 0.05% by weight of said extract and an upper limit sufficient to promote whipping with the formation of a soft-frozen product, said stabilizer being capable of promoting freezing to fine uniform crystals and being incorporated in an amount between about 0.05% by weight of said extract and an upper limit sufficient to promote freezing to fine uniform crystals;

rapidly cooling the aqueous extract system to a temperature between about 35° and about 55° F., said extraction and cooling being performed with exclusion of air; and then whipping and chilling said aqueous system in the presence of a gas to form a whipped soft-frozen extract concentrate.

References Cited

UNITED STATES PATENTS

| 2,889,226 | 6/1959 | Hinckley | 99—71 X |
| 3,170,803 | 2/1965 | Morgan et al. | 99—199 |

FOREIGN PATENTS

| 979,531 | 1965 | Great Britain. |

OTHER REFERENCES

Lord, I. E., "Everybody's Cookbook," 1937, Harcourt, Brace & Co., New York, page 270.

Tuckey, S. L., Ice Cream Review, October 1937, pp. 69, 70, 72, 74.

Martin, W. H., Ice Cream Trade Journal, p. 12.

MAURICE W. GREENSTEIN, Primary Examiner

U.S. Cl. X.R.

99—28, 77, 78, 192